UNITED STATES PATENT OFFICE 2,502,708

NITRO-HYDROGENATED CARDANOLS AND PROCESS FOR PREPARING SAME

Charles R. Dawson, New York, and David Wasserman, Brooklyn, N. Y., assignors, by mesne assignments, to The Harvel Corporation, a corporation of New Jersey No Drawing. Application March 31, 1945,
Serial No. 586,040

4 Claims. (Cl. 260—622)

This invention relates to novel compositions of matter and to methods for preparing the same. More particularly the invention is directed to novel methods of treating hydrogenated cardanol to produce various novel derivatives thereof. In one of its more specific aspects the invention is directed to methods for nitrating hydrogenated cardanol to obtain nitro derivatives thereof.

A phenol having an unsaturated hydrocarbon substituent containing 15 carbon atoms may be obtained by distilling cashew nut shell liquid at reduced pressure and at elevated temperatures. The phenol thus obtained and generally known as cardanol has the following general formula:

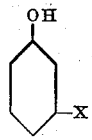

where X is an unsaturated hydrocarbon substituent containing 15 carbon atoms. A specific method for obtaining said compound is by distilling cashew nut shell liquid below about 50 mm. of mercury pressure and at temperatures between about 525° F. and 700° F. When distilled under reduced pressure of 10 mm. of mercury, the temperature employed is about 450° F. The distillate thus collected consists essentially of a phenol having an unsaturated hydrocarbon substituent containing 15 carbon atoms and having a boiling point of approximately 225° C. at 10 mm. of mercury pressure. This compound may be hydrogenated to completely saturate said hydrocarbon substituent by bubbling hydrogen therethrough and in the presence of a catalyst such as palladium black to provide hydrogenated cardanol having the following formula:

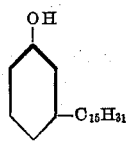

In the practice of this invention the hydrogenated cardanol which is normally solid at room temperature, is dissolved in any suitable solvent. The solvents which are preferably employed are those capable of maintaining said hydrogenated cardanol in solution (equal volumes) at approximately 10° C.; those having boiling points no greater than approximately 150° C.; those having freezing points below 0° C.; those which are substantially unaffected by or inert to nitric acid or fuming nitric acid; those that do not react with hydrogenated cardanol in the presence or absence of nitric or fuming nitric acid. Examples of some of said solvents are benzene, toluene, acetic anhydride, chloroform, carbon tetrachloride, dichlor ethane, trichlor ethane, dichlor ethylene, monochlor butane and the like. Of these we prefer to employ the chlorinated alkyl hydrocarbons, some of which are before mentioned. Generally the volume ratio of solvent to the hydrogenated cardanol is between about 1 to 1 and 6 to 1 and preferably about 2 to 1 and 3 to 1.

One part by volume of hydrogenated cardanol is preferably first comminuted and then added to about 1 to 6 volumes and preferably 2 to 3 volumes of one or a combination of two or more of said solvents and this mixture is agitated until the comminuted hydrogenated cardanol is dissolved therein at room temperature to provide a substantially clear solution. The temperature of this solution is then reduced to between about 0° C. and 20° C. by any suitable refrigeration means. Then to said solution is slowly added a quantity of an aqueous solution of nitric acid. During this addition the reaction mixture is constantly agitated and maintained at temperatures between about 0° C. and 20° C. and preferably 8° C. to 20° C. The quantity of said aqueous solution of nitric acid added to said solution of hydrogenated cardanol in said solvent is such that there is added to said mixture 1 to 2 moles of HNO₃ for each mole of hydrogenated cardanol. The concentration of aqueous nitric acid solution employed in said mixture is at least 35% HNO₃ and preferably 35% to 92% HNO₃.

After the last increment of said aqueous solution of HNO₃ is added, the entire mass is stirred for an additional 30 to 60 minutes. The resultant reaction product which is a mixture of a number of different compounds may be separated from the mother liquor and will be found to have melting points between about 30° C. and 55° C. depending upon the amount as well as the concentration of the nitric acid employed. These various reaction products may be separated from the mother liquor and may be used as anti-oxidants for mineral, animal, vegetable and marine like oils and fats such as petroleum oils, lubricating oils, fats, olive oil, linseed oil, China-wood oil, soyabean oil, fish oils, fish liver oils and the like. They are also useful as insecticides. They can be emulsified with water in the presence of alkalis to give materials which may be used as fungicides with proteins such as gelatin, glue, vegetable proteins, casein and the like. Said products may also be used in gasoline as gum inhibitors. They may be used as a constituent in compounding rubber or they may be treated in order to provide an amino group in place of the nitro group and serve the same or similar purpose in the aforementioned fields. They may be reacted with formaldehyde to provide resinous condensation products. They may be added to mixtures of paraformaldehyde and polymerized cashew nut shell liquid to accelerate condensation.

When employed as anti-oxidants it is preferable to add .1 to 2 parts by weight of one of said products to 100 parts of said oils. These products may be treated with suitable solvents in order to separate therefrom certain compounds which are in admixture therein. These products contain 6-nitro hydrogenated cardanol as well as 4-nitro hydrogenated cardanol in varying proportions by weight. These compounds have the following general formulae:

6-nitro hydrogenated cardanol (6-nitro 3 pentadecyl phenol)

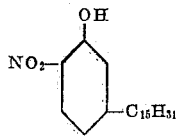

4-nitro hydrogenated cardanol (4-nitro 3 pentadecyl phenol)

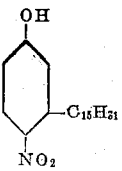

and may be separated from each other with petroleum ether (boiling point 40° C.) which selectively dissolved the 6-nitro hydrogenated cardanol leaving the 4-nitro hydrogenated cardanol. These specific compounds also act as anti-oxidants for said oils and also are useful as insecticides. These novel compounds may be further nitrated to produce di as well as tri-nitro compounds which are also useful as anti-oxidants and insecticides. These novel compounds may also be reduced and further diazotized to produce intermediates for coloring agents and to produce anti-oxidants.

The following Examples 1 to 6 inclusive illustrate the manner for producing these novel nitro compounds.

*Example 1*

20 grams of hydrogenated cardanol are dissolved in 75 cc. of chloroform at room temperature. This solution is refrigerated until its temperature is approximately 10° C. Then 5.3 grams of fuming nitric acid (sp. gr. 1.5) is slowly added to said solution which is maintained at said temperature and constantly agitated throughout. After the last increment of said nitric acid has been added, the entire mass, still maintained at said temperature, is stirred for an additional period of time which may be 30 to 60 minutes. Then the entire mass is poured into a large volume of cold water at about 0° C.-4° C. whereupon the excess nitric acid is diluted. This diluted reaction mixture is placed in a flask and suction is applied to said flask whereupon the solvent, chloroform, is removed from said mix leaving behind a light brown liquid mass consisting of two main layers, an oily layer and a watery layer. This liquid mass is cooled to about 0° C. whereupon the oily portion solidifies and is removed by filtration.

This solidified mass is dried under vacuum and in its dry state weighs approximately 23 grams and melts between 43° C.-53° C. To said solid mass is now added 250 gr. of petroleum ether (boiling point 40° C.) which is slowly heated to about 30° C. in order to completely dissolve the same. Then this solution is cooled to 4° C. whereupon 8 grams of light tan powdered solid crystallize out. The liquid is separated by filtration from the light tan solid, which light tan solid melts between 60° C.-66° C. and consists essentially of 4-nitro hydrogenated cardanol. The filtrate is now heated to distill off all the petroleum ether leaving behind an oily mass. This oily mass is then dissolved in ethyl alcohol. This alcoholic solution is chilled whereupon light tan crystals precipitate or crystallize out therefrom and consist essentially of 6-nitro hydrogenated cardanol, measuring approximately 5.5 grams and melting between 34° C.-36° C.

*Example 2*

20 grams of hydrogenated cardanol are dissolved in 75 cc. of chloroform at room temperature. This solution is refrigerated until its temperature is approximately 10° C. Then 6.6 grams of concentrated nitric acid (70% HNO₃) is slowly added to said solution which is maintained at said temperature and constantly agitated throughout. After the last increment of said nitric acid has been added the entire mass, still maintained at said temperature, is stirred for an additional period of time which may be 30 to 60 minutes. Then the entire mass is poured into a large volume of cold water at about 0° C.-4° C. whereupon the excess nitric acid is greatly diluted.

This diluted reaction mixture is placed in a flask and suction is applied to said flask whereupon the solvent, chloroform, is removed from said mix leaving behind a brown liquid mass consisting essentially of two main layers, an oily layer and a watery layer. This liquid mass is cooled to about 0° C. whereupon the oily portion solidifies and is removed by filtration. This solidified mass is dried under vacuum and in its dry state weighs approximately 22.7 grams and melts between 33° C.-35° C. To said solid mass are now added 250 grams of petroleum ether (boiling point 40° C.) which is slowly heated to about 40° C. in order to completely dissolve the same. Then this solution is cooled to 4° C. whereupon 6.5 grams of dark red brown powdered solid crystallizes out. The liquid is separated by filtration from the dark red brown solid, which dark red brown solid melts between 63° C.-67° C. and consists essentially of 4-nitro hydrogenated cardanol. The filtrate is now heated to distill off all the petroleum ether leaving behind an oily mass. This oily mass is then dissolved in ethyl alcohol. This alcoholic solution is chilled whereupon a red brown mass precipitates or crystallizes out therefrom and consists essentially of 6-nitro hydrogenated cardanol, measuring approximately 5.5 grams and which melts between 34° C.-36° C.

*Example 3*

20 grams of hydrogenated cardanol are dissolved in 50 cc. benzene at room temperature. This solution is refrigerated until its temperature is approximately 20° C. Then 13.2 grains of nitric acid (35% HNO₃) is slowly added to said solution which is maintained at said temperature and constantly agitated throughout. After the last increment of said nitric acid has been added the entire mass, still maintained at said temperature, is stirred for an additional period of time which may be 30 to 60 minutes. Then the entire mass is poured into a large volume of cold water at about 0° C. to 4° C. whereupon the excess nitric acid is greatly diluted. This diluted reaction mixture is placed in a flask and suction is applied to said flask whereupon the solvent, benzene, is removed from said mix leaving behind a red brown liquid mass consisting of two main layers, an oily layer and a watery layer. This liquid mass is cooled to about 0° C. whereupon the oily portion solidifies and is removed by filtration. This solidified mass is dried under vacuum and in the dry state weighs approximately 21.4 grams and melts between 37° C.–48° C. To said solid mass are now added 250 grams of petroleum ether (boiling point 40° C.) which is slowly heated to about 30° C. in order to completely dissolve the same. Then this solution is cooled to 4° C. whereupon 7.5 grams of light brown powdered solid crystallizes out. The liquid is separated by filtration from the light brown solid, which light brown solid melts between 61° C.–65° C. and consists essentially of 4-nitro hydrogenated cardanol. The filtrate is now heated to distill off all the petroleum ether leaving behind an oily mass. This oily mass is then dissolved in ethyl alcohol. This alcoholic solution is chilled whereupon tan solid precipitates or crystallizes out and consists essentially of 6-nitro hydrogenated cardanol, measuring approximately 5.5 grams and melting between 30° C.–32° C.

Example 4

20 grams of hydrogenated cardanol are dissolved in 50 cc. of benzene at room temperature. This solution is refrigerated until its temperature is approximately 10° C. Then 26.4 grams of nitric acid (35% $HNO_3$) is slowly added to said solution which is maintained at said temperature and constantly agitated throughout. After the last increment of said nitric acid has been added the entire mass, still maintained at said temperature, is stirred for an additional period of time which may be 30 to 60 minutes. Then the entire mass is poured into a large volume of cold water at about 0° C.–4° C. whereupon the excess nitric acid is greatly diluted. This diluted reaction mixture is placed in a flask and suction is applied to said flask whereupon the solvent, benzene, is removed from said mix leaving behind a liquid mass consisting of an oily portion and a watery portion. This liquid mass is cooled to about 0° C. whereupon the oily portion solidifies and is removed by filtration. This solid mass is dried under vacuum and in its dry state is a brown powder, weighs approximately 23 grams and melts between 33° C.–45° C. To said solid are now added 250 grams of petroleum ether (boiling point 40° C.) which is slowly heated to about 30° C. in order to completely dissolve the same. Then this solution is cooled to 4° C. whereupon 8 grams of light tan powdered solid crystallizes out. The liquid is separated by filtration from the light tan solid which light tan solid melts between 61° C–65° C. and consists essentially of 4-nitro hydrogenated cardanol. The filtrate is now heated to distill off all the petroleum ether leaving behind an oily mass. This oily mass is then dissolved in ethyl alcohol. This alcoholic solution is chilled whereupon light tan solid precipitates or crystallizes out therefrom and consists essentially of 6-nitro hydrogenated cardanol, measuring approximately 5.5 grams and melting between 33° C.–35° C.

Example 5

20 grams of hydrogenated cardanol are dissolved in 50 cc. of benzene at room temperature. This solution is refrigerated until its temperature is approximately 10° C. Then 13.2 grams of concentrated nitric acid (70% $HNO_3$) is slowly added to said solution which is maintained at said temperature and constantly agitated throughout. After the last increment of said nitric acid has been added the entire mass, still maintained at said temperature, is stirred for an additional period of time which may be 30 to 60 minutes. Then the entire mass is poured into a large volume of cold water at about 0° C.–4° C. whereupon the excess nitric acid is greatly diluted. This diluted reaction mixture is placed in a flask and suction is applied to said flask whereupon the solvent, benzene, is removed from said mix leaving behind a liquid mass consisting of an oily portion and a watery portion. This liquid mass is cooled to about 0° C. whereupon the oily portion solidifies and is removed by filtration. This solid mass is dried under vacuum and in its dry state is red, weighs approximately 19.0 grams and melts between 33° C.–35° C. To said solid are now added 250 grams of petroleum ether (boiling point 40° C.) which is slowly heated to about 30° C. in order to completely dissolve the same. Then this solution is cooled to 4° C. whereupon 2.0 grams of light yellow powdered solid crystallize out. The liquid is separated by filtration from the light yellow solid, which light yellow crystals melt between 58° C.–63° C. and consists essentially of 4-nitro hydrogenated cardanol. The filtrate is now heated to distill off all the petroleum ether leaving behind an oily mass. This oily mass is then dissolved in ethyl alcohol. This alcoholic solution is chilled whereupon light brown solid precipitates and crystallizes out therefrom and consists essentially of 6-nitro hydrogenated cardanol, measuring approximately 7.8 grams and melting between 28° C.–31° C.

Example 6

20 grams of hydrogenated cardanol are dissolved in 40 cc. of benzene and 50 cc. of acetic anhydride. This solution is refrigerated until its temperature is approximately 10° C. Then 6.6 grams of concentrated nitric acid (70% $HNO_3$) is slowly added to said solution which is maintained at said temperature and constantly agitated throughout. After the last increment of said nitric acid has been added the entire mass, still maintained at said temperature, is stirred for an additional period of time which may be 30 to 60 minutes. Then the entire mass is poured into a large volume of cold water (about 0° C.–4° C.) whereupon the excess nitric acid is greatly diluted and the acetic anhydride is dissolved in said water. This diluted reaction mix is placed in a flask and suction is applied to said flask whereupon benzene is removed from said mix leaving behind a liquid mass consisting of an oily portion and a watery portion. This liquid mass is cooled to about 0° C. whereupon the oily portion solidifies and is removed by filtration. This solidified mass is dried under vacuum and in the dry state is a brown solid weighing approximately 22.5 gr. and melting between 33° C.–35° C. To said solid are now added 250 grams of petroleum ether (boiling point 40° C.) which is slowly heated to about 30° C. in order to completely dissolve the same. Then this solution is cooled to 4° C. whereupon 6.5 gr. of light brown powdered solid crystallizes out. The liquid is separated by filtration from the said light brown powdered solid, which light brown solid melts between 63° C.-67° C. and consists essentially of 4-nitro hydrogenated cardanol. The filtrate is now heated to distill off all the petroleum ether leaving behind an oily mass. This oily mass is then dissolved in ethyl alcohol. This alcoholic solution is chilled whereupon light tan crystals precipitate or crystallize out therefrom which are comprised essentially of 6-nitro hydrogenated cardanol, measuring approximately 6.0 grams and melting between 34° C.-36° C.

Said novel compounds may be readily treated to provide amino compounds. For example, 150 grams of 6-nitro hydrogenated cardanol or 4-nitro hydrogenated cardanol may be placed in a flask then 80 grams of granulated tin may be added thereto. Subsequently 290 grams of concentrated hydrochloric acid may be slowly added to said mixture while the same is refrigerated in order to maintain the temperature thereof at approximately room temperature. After the last increment of acid has been added the mixture may be gradually heated on a water bath until drops of nitro hydrogenated cardanol are no longer visible. The reaction mixture may now be cautiously treated with solid sodium hydroxide in excess of the equivalent amount of acid present and the liberated amino compound may be separated therefrom to provide compounds having the following formulae:

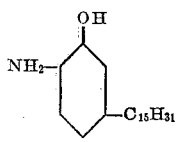

or

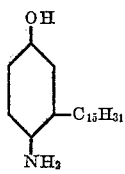

Such amino compounds have exceedingly high oil solubility characteristics in the oils heretofore mentioned and also have unusual anti-oxidant properties.

Since certain changes in carrying out the above process and certain modifications in the compositions which embody the invention may be made without departing from its scope, it is intended that all matter contained in the above description shall be interpreted as illustrative and not in a limiting sense.

Having thus described our invention, what we claim and desire to protect by Letters Patent is:

1. The method of nitrating hydrogenated cardanol comprising adding an aqueous solution of nitric acid to a solution of hydrogenated cardanol in a solvent having a boiling point no greater than 150° C. and a melting point less than 0° C. and capable at 10° C. of maintaining an equal volume of hydrogenated cardanol in solution, the temperature of said solution maintained between about 0° C. and 20° C. during said addition of said aqueous solution of $HNO_3$, the concentration of said aqueous solution of $HNO_3$ being within about 35% to 92% $HNO_3$, and the quantity of said aqueous solution of $HNO_3$ added to said solution of hydrogenated cardanol in said solvent being such that the molar ratio of $HNO_3$ to hydrogenated cardanol is between about 1 to 1 and 2 to 1.

2. A novel compound selected from the group consisting of 4-nitro hydrogenated cardanol and 6-nitro hydrogenated cardanol.

3. A novel compound being 4-nitro hydrogenated cardanol.

4. A novel compound being 6-nitro hydrogenated cardanol.

CHARLES R. DAWSON.
DAVID WASSERMAN.

REFERENCES CITED

The following references are of record in the file of this patent:

UNITED STATES PATENTS

| Number | Name | Date |
|---|---|---|
| 2,207,727 | Galloway | July 16, 1940 |
| 2,284,369 | Caplan | Nov. 26, 1942 |
| 2,431,127 | Kremers | Nov. 18, 1947 |
| 2,488,472 | Kremers | Nov. 15, 1949 |

OTHER REFERENCES

Clemence et al., "Isomeric Nitro-Cresols," Jour. American Pharmaceutical Assn., vol. XXIII, No. 6 (June, 1934), pages 536-41 (6 pages).